Aug. 1, 1961 J. MUSSARI, JR 2,994,286
ADJUSTABLE PATTY MOLD
Filed July 29, 1958
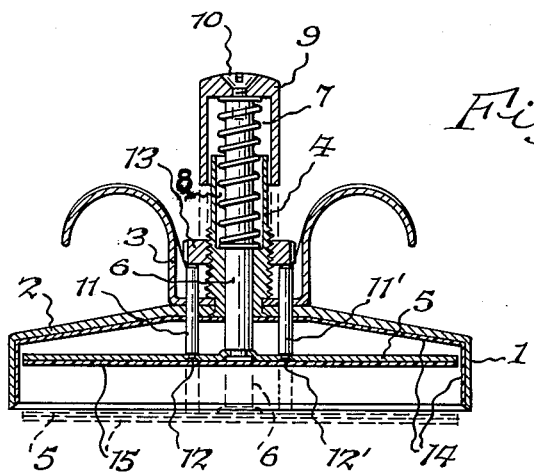
Fig. 1.
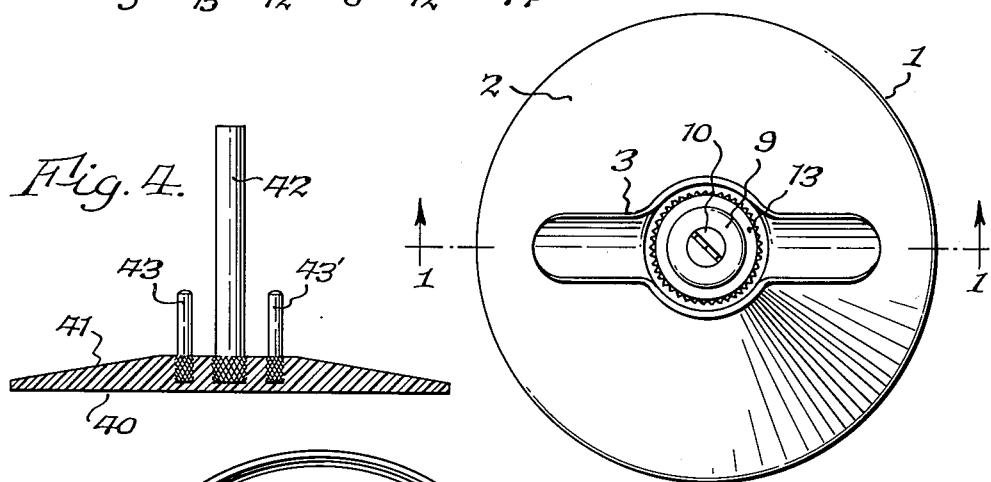
Fig. 2.
Fig. 4.
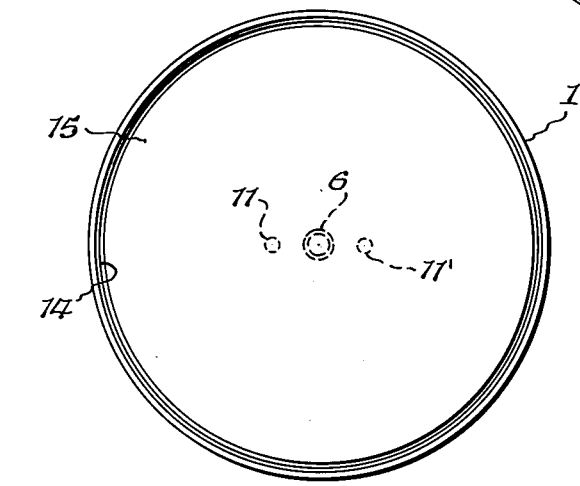
Fig. 3.
INVENTOR.
Joseph Mussari Jr.
BY W J Soley
Attorney.

United States Patent Office 2,994,286
Patented Aug. 1, 1961

2,994,286
ADJUSTABLE PATTY MOLD
Joseph Mussari, Jr., 724 16th St., Niagara Falls, N.Y.
Filed July 29, 1958, Ser. No. 751,765
6 Claims. (Cl. 107—19)

This invention relates to an adjustable mold and more particularly to patty molds, such as are used for forming food stuff into patties or cakes.

One of the objects of the invention is to provide a mold that forms patties of uniform thickness. Another object is to provide a mold that is adjustable so that patties of different thicknesses can be produced. Still another object of the invention is to provide a mold from which the patties formed therein can be removed readily. Other objects will be readily observed from the following disclosure.

In the drawings:

FIGURE 1 is a sectional view, along the line 1—1 of FIGURE 2, of one modification of the present invention;

FIGURE 2 is a top plan view illustrating the patty mold shown in section in FIGURE 1;

FIGURE 3 is a plan view, from below, of the modification illustrated in FIGURE 1 and FIGURE 2; and FIGURE 4 is a sectional view of another modification of the mold plate shown in FIGURE 1 and FIGURE 3.

In FIGURE 1 there is shown a mold barrel 1 having a top or end closure 2 integral therewith and a finger grip 3 fastened thereto by any suitable means, e.g. by spot welding or by a hollow post 4, the one end of which passes through the finger grip 3 and the mold top 2 and is upset or swaged into intimate contact with the inner face of the said mold top.

Within said mold barrel is shown, in FIGURE 1, a mold plate 5 attached to the end of a push rod 6 by swaging or other suitable method. The push rod 6 extends from within the mold barrel through the hollow post 4 and through a helical spring 7 which is contained in a spring cavity 8 in said post. Beyond the hollow post 4 the push rod 6 is fastened by a screw 10 to a hollow cap 9, which telescopes a portion of said post.

Also shown in FIGURE 1 are two limit posts 11 and 11', which abut the mold plate 5 and are fastened thereto by swaged or upset portions 12 and 12', which pass through said mold plate. The extent of movement of the limit posts 11 and 11', and consequently of the mold plate 5 is controlled by the limit nut 13, which is in threaded relationship with the hollow post 4.

In FIGURE 1 there is also shown a plastic or resin coating 14 on the inner surface of the mold barrel 1 and a plastic or resin coating 15 on the lower surface of the mold plate 5. One resin that is particularly suitable for this purpose is the polytetrafluoroethylene resin sold by E. I. du Pont de Nemours and Company under the trademark "Teflon," which is obtainable as a dispersion and can be applied by dipping or by spraying. A coating of polytetrafluoroethylene on the inside surface of the mold barrel 1 and on the lower surface of the mold plate 5 is useful in preventing the sticking of foodstuffs to those surfaces.

Polytetrafluoroethylene resin is available in various colors, including white, and a white resin is desirable for molds used in forming patties of food stuffs because of its indication of cleanliness.

Inasmuch as the practice of properly providing a satisfactory film of polytetrafluoroethylene on metal surfaces is a well known art there is no need to describe that practice here.

FIGURE 2, as stated above is a top plan view of the patty mold shown in section in FIGURE 1, and shows the mold barrel 1 with a top or end closure 2 and a finger grip 3. FIGURE 2 also shows the hollow cap 9, a screw head 10 and the limit nut 13.

FIGURE 3, which is a plan view from below, shows the mold barrel 1 with its plastic film 14 attached thereto, and the plastic coated surface 15 of the mold plate 5. Also indicated in FIGURE 3 are the push rod 6 and the limit posts 11 and 11'.

FIGURE 4 is a sectional view of a modification of a mold plate 40 together with limit controls and a push rod. This modification comprises a truncated cone 41 of molded resin (for example, "Teflon" polytetrafluoroethylene) with a metal push rod 42 and two metal limit control posts 43 and 43', the ends of which are molded therein to form a unified structure. "Teflon" polytetrafluoroethylene molding powder is moldable by a well known technique, which need not be described here. A polytetrafluoroethylene mold plate has the advantage of being strong and non-adhesive with respect to materials to be molded in the mold chamber.

The device of the present invention is very easy to operate and will continue to produce patties of the same thickness unless and until the adjustment or limit nut 13 is changed to permit the mold plate 5 to move inwardly or outwardly, thus providing either a deeper or a more shallow mold, as the case may be. The first step in using the patty mold is to ascertain what thickness of patty is desired. Inasmuch as different materials shrink different amounts in the cooking operation, some experimentation is required to find the desired depth of cavity of the device. That may be ascertained by packing an excess of filling material in the mold barrel and then striking off that portion which projects beyond the rim of the mold barrel. Subsequent patties can be made thicker or thinner as desired by moving the limit nut 13 upward or downward as required to produce the wanted thickness of patty. In either case an excess of material is placed in the mold and such excess is struck off to the rim of the barrel.

By holding the winged finger grip 3 by the index and middle fingers, the cap on the push rod can be engaged by the thumb of the same hand and pressed downwardly to push the patty out of the mold. The polytetrafluoroethylene on the face of the mold plate and the interior surface of the mold barrel prevents the molded material from being stuck to either of those surfaces.

The patty mold of the present invention can be kept clean and sanitary very easily without being dissembled, but can be taken apart very quickly if necessary or desired.

Having thus described my invention, I claim:

1. A mold comprising a hollow cylindrical casing open at one end and closed at the other, a resinous mold plate positioned concentrically within said casing and moveable longitudinally therein, a push rod having one end fastened to the geometric center of said mold plate and projecting through a hole in the center of the closed end of said cylindrical casing and through a hollow post attached to the closed end of said casing, a helical spring located in the hollow of said hollow post and concentrically with said push rod, one end of said spring being in engagement with a cap fastened to said push rod and the other end of said spring being in engagement with the base of said hollow, and a plurality of adjustment posts attached to said mold plate and projecting therefrom and through holes in the closed end of said cylindrical casing and into engagement with an adjustably positioned nut on said hollow post.

2. A mold comprising a hollow cylindrical casing open at one end and closed at the other, and having a plastic film on its inner surface, a plastic coated mold plate concentrically positioned within said casing and moveable longitudinally therein, a push rod having one end fastened to the geometric center of said mold plate and projecting through a hole in the geometric center of the closed end of said cylindrical casing and through a hollow post attached to the closed end of said casing, a helical spring located in the hollow of said hollow post and concentrically with said push rod, one end of said spring being in engagement with a cap fastened to said push rod and the other end of said spring being in engagement with the base of said hollow, and a plurality of adjustment posts attached to the said mold plate and projecting therefrom and through holes in the closed end of said cylinder casing and into engagement with an adjustably positioned nut on said hollow post.

3. A mold comprising a hollow cylindrical casing open at one end and closed at the other, a plastic coated mold plate concentrically positioned within said casing and moveable longitudinally therein, a push rod having one end fastened to the geometric center of said mold plate and projecting through a hole in the geometric center of the closed end of said cylindrical casing and through a hollow post attached to the closed end of said casing, a helical spring located in the hollow of said hollow post and concentrically with said push rod, one end of said spring being in engagement with a cap fastened to said push rod and the other end of said spring being in engagement with the base of said hollow, and a plurality of adjustment posts attached to the said mold plate and projecting therefrom and through holes in the closed end of said cylindrical casing and into engagement with an adjustably positioned nut on said hollow post.

4. A mold comprising a cylindrical casing open at one end and closed at the other, a mold plate positioned concentrically within said casing and moveable longitudinally therein, a push rod having one end fastened to the geometric center of said mold plate and projecting through a hole at the geometric center of the closed end of said cylindrical casing and through a hollow post attached to the closed end of said casing, a helical spring located in the hollow of said hollow post and concentrically with said push rod, one end of said spring being in engagement with a cap fastened to said push rod and the other end of said spring being in engagement with the base of said hollow post, and a plurality of adjustment posts attached to the said mold plate and projecting therefrom and through holes in the closed end of said cylinder casing and into engagement with an adjustably positioned nut on said hollow post.

5. A mold comprising a cylindrical casing open at one end and closed at the other, and having a resinous film on its inner surface, a resin coated mold plate positioned concentrically within said casing and moveable longitudinally therein, a push rod having one end fastened to the geometric center of said mold plate and projecting through a hole at the geometric center of the closed end of said cylindrical casing and through a hollow post attached to the closed end of said casing, a helical spring located in the hollow of said hollow post and concentrically with said push rod, one end of said spring being in engagement with a cap fastened to said push rod and the other end of said spring being in engagement with the base of said hollow post, and a plurality of adjustment posts attached to the said mold plate and projecting therefrom and through holes in the closed end of said cylinder casing and into engagement with an adjustably positioned nut on said hollow post.

6. A mold comprising a hollow cylindrical casing open at one end and closed at the other, a resin coated mold plate concentrically positioned within said casing and moveable longitudinally therein, a push rod having one end fastened to the geometric center of said mold plate and projecting through a hole in the geometric center of the closed end of said cylindrical casing and through a hollow post attached to the closed end of said casing, a helical spring located in the hollow of said hollow post and concentrically with said push rod, one end of said spring being in engagement with a cap fastened to said push rod and the other end of said spring being in engagement with the base of said hollow and a plurality of adjustment posts attached to the said mold plate and projecting therefrom and through holes in the closed end of said cylindrical casing and into engagement with an adjustably positioned nut on said hollow post.

References Cited in the file of this patent

UNITED STATES PATENTS

| 1,390,170 | Shaffer | Sept. 6, 1921 |
| 1,949,772 | Allen | Mar. 6, 1934 |
| 2,008,725 | Parker | July 23, 1935 |
| 2,403,476 | Berry et al. | July 9, 1946 |
| 2,600,281 | Sticelber | June 10, 1952 |
| 2,837,761 | Stiegler | June 10, 1958 |